(12) United States Patent
Mene et al.

(10) Patent No.: US 12,204,337 B2
(45) Date of Patent: Jan. 21, 2025

(54) MULTIDIRECTIONAL MOVEMENT OF MATERIALS

(71) Applicant: INTERNATIONAL BUSINESS MACHINES CORPORATION, Armonk, NY (US)

(72) Inventors: Atul Mene, Morrisville, NC (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 17/736,326

(22) Filed: May 4, 2022

(65) Prior Publication Data

US 2023/0359211 A1    Nov. 9, 2023

(51) Int. Cl.
*G05D 1/00* (2024.01)
*B66F 9/06* (2006.01)
*B60B 19/00* (2006.01)

(52) U.S. Cl.
CPC .......... *G05D 1/0217* (2013.01); *B66F 9/063* (2013.01); *G05D 1/0214* (2013.01); *B60B 19/003* (2013.01)

(58) Field of Classification Search
CPC ....... B66F 9/063; B66F 9/0755; B60B 19/003
See application file for complete search history.

(56) References Cited

U.S. PATENT DOCUMENTS

| | | | |
|---|---|---|---|
| 9,371,183 B2 | 6/2016 | Toebes | |
| 9,733,646 B1 | 8/2017 | Nusser | |
| 10,110,617 B2 | 10/2018 | Muddu | |
| 10,518,407 B2 | 12/2019 | Williams | |
| 10,611,613 B2* | 4/2020 | Wong | G01S 5/16 |
| 10,913,148 B2 | 2/2021 | Williams | |
| 2017/0063886 A1 | 3/2017 | Muddu | |
| 2017/0088355 A1 | 3/2017 | Khodl | |
| 2017/0312916 A1 | 11/2017 | Williams | |
| 2018/0333845 A1 | 11/2018 | Williams | |
| 2020/0051195 A1 | 2/2020 | Asaria | |
| 2020/0156869 A1* | 5/2020 | Hu | B66F 9/063 |
| 2020/0183397 A1* | 6/2020 | Rossi | G05D 1/0274 |
| 2021/0147202 A1* | 5/2021 | Black | G05D 1/0246 |

(Continued)

OTHER PUBLICATIONS

"Access Floor Installation Manual", Offices and Data Centers, Tate Access Floors, 2012, 48 pages.

(Continued)

*Primary Examiner* — Joseph C Rodriguez
(74) *Attorney, Agent, or Firm* — Monchai Chuaychoo

(57) ABSTRACT

An approach for moving materials from one location to another is disclosed. The approach includes a mobility platform comprising of a lower construct comprising of mechanism for locomotion, a platform dispose on top of and adjacent to the lower construct and an upper construct dispose and adjacent to the platform, wherein the upper construct comprising of a mechanism for securing materials. Furthermore, the approach includes loading one or more materials onto the mobility platform from a first location, moving the mobility platform from the first location to a second location and unloading the one or more materials from the mobility platform at the second location.

6 Claims, 6 Drawing Sheets

(56) References Cited

U.S. PATENT DOCUMENTS

2023/0236060 A1* 7/2023 Sukalski ............... G01G 19/08
177/136
2023/0359211 A1* 11/2023 Mene ................. B66F 9/07577

OTHER PUBLICATIONS

"Build smarter supply chains with AI and blockchain", IBM, downloaded from the internet on Mar. 15, 2022, 10 pages, https://www.ibm.com/supply-chain>.

"Code of Practice on the Design and Construction of Tower Working Platforms", Electrical and Mechanical Services Department 1997, 87 pages.

"Context based rapid material movement handling using centrifugal force", An IP.com Prior Art Database Technical Disclosure, Authors et al.: Disclosed Anonymously, IP.com No. IPCOM000263658D, IP.com Electronic Publication Date: Sep. 24, 2020, 4 pages.

"IBM Sterling Order Management—Overview", IBM, downloaded from the internet on Mar. 15, 2022, 4 pages, <https://www.ibm.com/products/order-management>.

"IBM Sterling solutions", IBM, downloaded from the internet on Mar. 15, 2022, 14 pages, <https://www.ibm.com/supply-chain/sterling>.

"Internet of Things on IBM Cloud", IBM, downloaded from the internet on Mar. 15, 2022, 9 pages, <https://www.ibm.com/cloud/internet-of-things>.

"System and Method to Automate Lifting and Conveyance of Platform-Based Objects of Varying Dimensions, Weights, and Center of Gravity, Using a Cognitive Network of Drones", An IP.com Prior Art Database Technical Disclosure, Authors et al.: Disclosed Anonymously, IP.com No. IPCOM000259243D, IP.com Electronic Publication Date: Jul. 22, 2019, 5 pages.

"System and Method to Deduce Occupancy Capacity of an Elevator Car and Evaluate the Probability of Stopping at a Given Floor, Considering the Members Awaiting the Elevator Car along with their Belongings", An IP.com Prior Art Database Technical Disclosure, Authors et al.: Disclosed Anonymously, IP.com No. IPCOM000267379D, IP.com Electronic Publication Date: Oct. 22, 2021, 3 pages.

King et al., "Robotic Tile Placement: Tools, Techniques and Feasibility", 2014, https://doi.org/10.1016/j.autcon.2013.08.014, 8 pages.

* cited by examiner

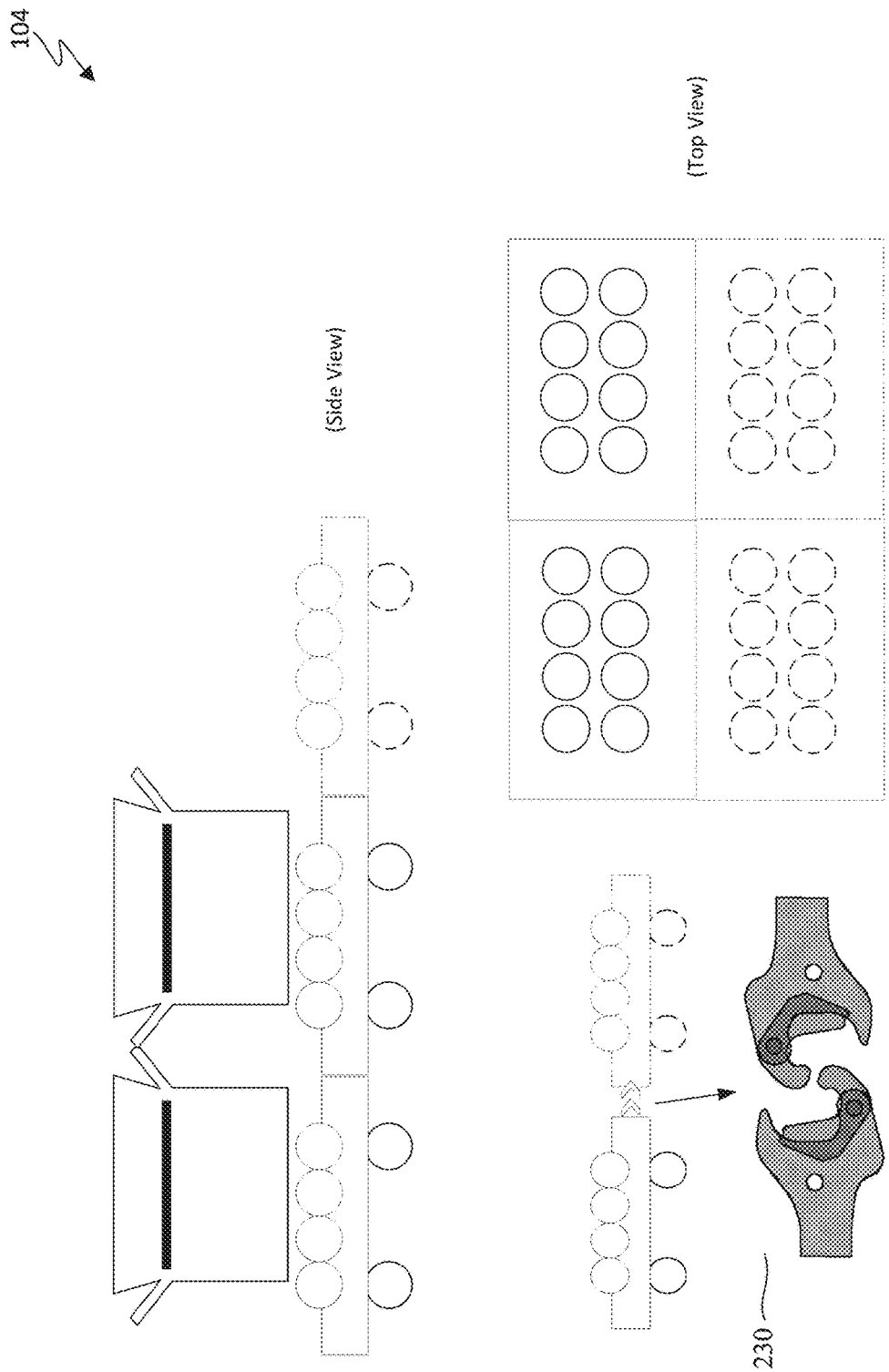
FIG. 2B  (Expandable and modular)

MULTIDIRECTIONAL MOVEMENT OF MATERIALS

BACKGROUND

The present invention relates generally to the field of materials handling system, and more particularly to multidirectional movement of materials.

In any industrial floor, there can be different types of requirements for a vast array for material(s) handling within an industrial setting. The movement of material can be from one machine to another machine, and/or it is performed as per the workflow. Additionally, there can be different types of material which are to be moved from one location to another location. These materials can be raw material, spare parts, manufactured parts from machines, etc.

SUMMARY

Aspects of the present invention disclose a computer-implemented method, a computer system and a mobility platform for moving materials from one location to another. The computer implemented method may be implemented by one or more computer processors and may include, reviewing tasks to be performed; analyzing environmental conditions to calculate an optimal route; analyzing material attributes; adjusting the mobility platform based on analysis of the material attributes; loading the material on the mobility platform; moving the modular movement platform to the target destination; and unloading the material from the mobility platform.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to another embodiment of the present invention, there is provided a mobility platform, further comprising of a lower construct comprising of mechanism for locomotion; a platform disposed on top of and adjacent to the lower construct; and an upper construct dispose and adjacent to the platform, wherein the upper construct comprising of a mechanism for securing materials.

BRIEF DESCRIPTION OF THE DRAWINGS

Preferred embodiments of the present invention will now be described, by way of example only, with reference to the following drawings, in which:

FIG. 2B is an alternative version of the modular capability of mobility platform 104 that can be expanded, in accordance with another embodiment of the present invention;

DETAILED DESCRIPTION

Figure 1:
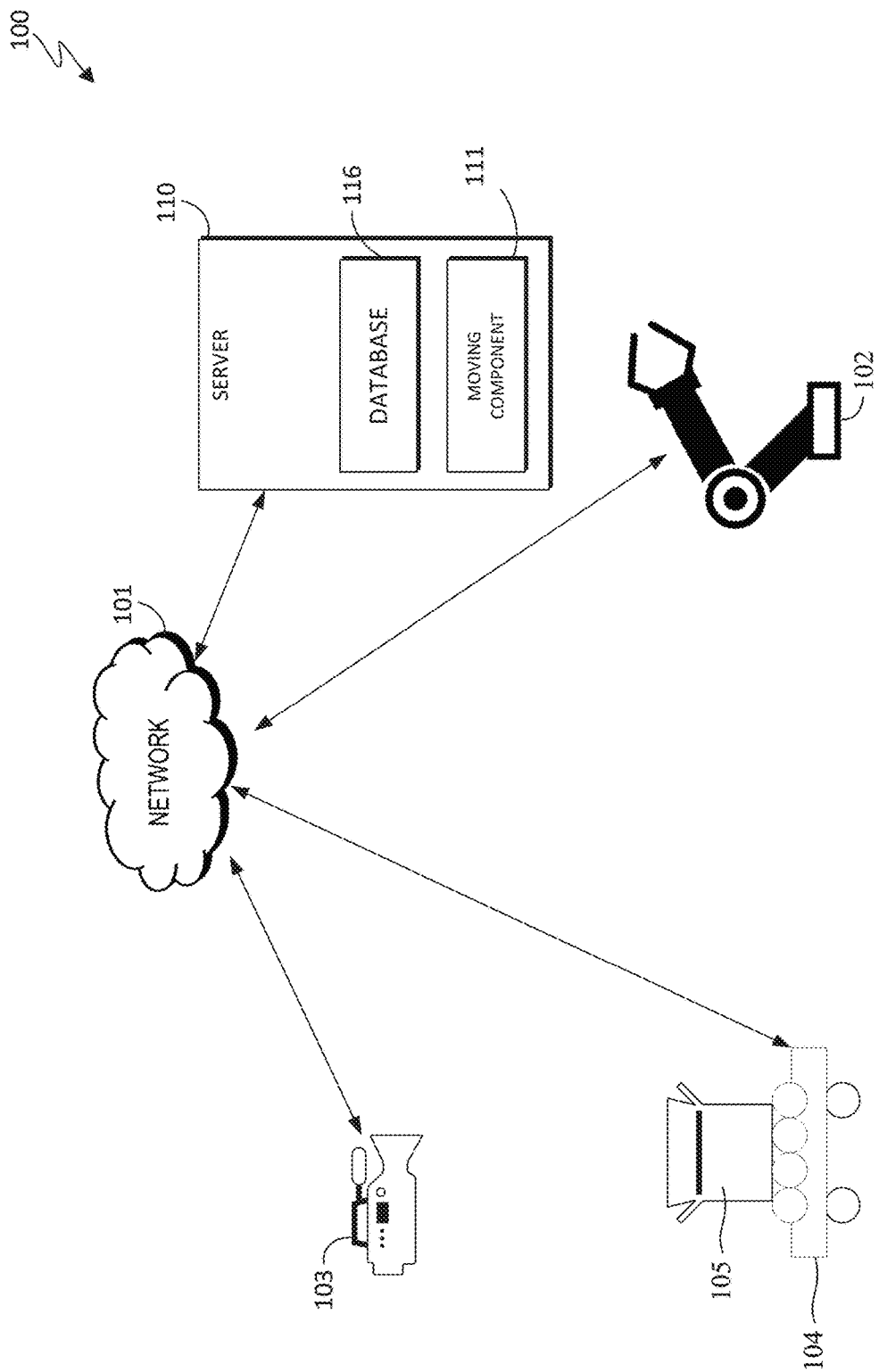
FIG. 1 is a functional block diagram illustrating a material mobility environment which includes mobility platform 104, designated as 100, in accordance with an embodiment of the present invention.

The current state of art as it pertains materials handling, can present some challenges. For example, various types of material that are to be moved from one location to another location in any industrial floor environment (or warehouse) may present difficulties due to the dimensions and the shape of the material since it can vary vastly from each one another. Although existing robotic material handling systems may establish material movement equipment within a fixed path (i.e., static path), but for different contextual needs, the material movement path may not always be static.

Embodiments of the present invention recognizes the deficiencies in the current state of art and provides an approach for dynamic movement for materials handling that does not need to conform to a static path. The approach utilizes a modular and expandable platform that allows movement materials based on intelligent workflow. The movement of the platform can be based on the contextual need, material, source/target locations and other parameters like activity workflow sequence, timing of material movement, etc. in an industrial shopfloor environment. The approach, leveraging artificial intelligence, can identify the need for pre-processing material before it is moved to the target location and move it to an intermediary location. The approach may analyze the material attributes (size, weight, pieces) before determining an optimal path and methodology. It is noted that the approach can be utilized in other environmental setting, such as warehouse, vehicle/aircraft repair facility or generally any facility requiring movement of materials from one location to another. The use of the approach in an industrial workshop application is merely an example and does not limit the application to one particular environment.

Some embodiments of the approach may recognize that reviewing tasks (e.g., platform movements, combining modular movement platforms) to be performed, can based on a historic knowledge corpus.

Some embodiments of the approach may recognize that analyzing weather data and environmental conditions (floor condition, slippery, pitted) can be used to calculate an optimal route based on distance of material movement, source and target location of material.

Some embodiments of the approach can adjust the modular movement of the platform which can be based on the analysis of the material attributes (selecting the modular movement platform, joining multiple movement platforms).

Some embodiments of the approach may place, by robot, the material on the modular movement platform and move the modular movement platform to the target destination, based on the calculated optimal route.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a material mobility environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Material mobility environment 100 includes network 101, devices 102, IoT devices 103, mobility platform 104, materials 105 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, devices 102, IoT devices 103, mobility platform 104, server 110 and other computing devices (not shown) within material mobility environment 100. It is noted that other computing devices can include, but is not limited to, devices 102, IoT devices 103 and any electromechanical devices capable of carrying out a series of computing instructions.

Devices 102 can be any electro-mechanical devices used in an industrial setting which may include, robotic-assisted assembly machines and materials movement (fixed path) system.

IoT devices 103 can be any smart device (e.g., thermal sensors/imaging, proximity sensors, distance measurement (i.e., laser range guide), object identification/detection cameras and microphones, etc.) that can detect real time sensory information/data.

Mobility platform 104 are modular and expandable platform(s) equipped with multiple segmented rollers along the topside, wherein the segmented rollers will synchronously work to move any boxes or materials (i.e., 105) in three-dimensional x-y-z axial direction. Along the bottom side of the platform, there are wheels that can also move the entire structure in any two-dimensions along the x-y direction. Mobility platform 104 will be described in greater details in FIGS. 2A and 2B.

Materials 105, generally are materials (e.g., boxes, packages, raw materials for assembly, etc.) are needed to be transported from one location to another in an environment (e.g., warehouse, repair shop, industrial assembly shop, etc.).

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within material mobility environment 100 via network 101. In another embodiment, server 110 represents a computing system utilizing clustered computers and components (e.g., database server computers, application server computers, etc.) that act as a single pool of seamless resources when accessed within material mobility environment 100.

Embodiment of the present invention can reside on server 110. Server 110 includes mobility component 111 and database 116.

Generally, mobility component 111 manages and controls one or more mobility platform 104 in an environment (e.g., industrial shopfloor setting, logistic warehouse, etc.). Additionally, mobility component 111 can communicate with devices 102, IoT devices 103 and database 116 in order to determine various optimal recommendations for material handling/movement. For example, one recommendation can include the capability of allowing autonomous materials movement on an industrial floor setting. For example, based on contextual need of material movement from one location to another location on any machine shopfloor, a set of individual modular material movement platform (i.e., mobility platform 104) can dynamically be assembled and/or coupled with each other to create a larger material movement platform in the machine shopfloor, and accordingly the platform(s) can be instructed to move in different directions in a programmatic manner. Furthermore, a robotic system on the industrial floor (near an assembly machine) can place the material on the larger material on mobility platform 104.

Another recommendation can include management of an intelligent workflow (via machine learning and/or Artificial Intelligence) related to the materials placement. Workflows in this context is a general terminology used in industrial/manufacturing scenarios where products are to be assembled. Thus, workflows can include, certain materials to be used at a certain machine at a certain time as not to miss assembly of a product. Workflows can include routine schedule of when and where to load which machines with what raw material. Or workflows can be dynamic based on the just-time-time manufacturing methodology. Thus, workflows can be driven by business needs instead of routine manufacturing schedule. For example, based on the identified activity workflow, types of materials are to be handled, the mobility component 111 can recognize each material are to be moved and will dynamically adjust the material movement parameters individually from one location to another location. Other factors that may influence workflow activities can include, i) timing of materials movement, ii) distance (source and target destination of material movement), ii) sequency (i.e., identifying the sequence of material movement the properties of material movement).

Another recommendation can include optimizing materials require at each location. For example, the recommendation can analyze different source and target location of different materials and accordingly the modular platforms can be assembled in an optimum manner so that faster material movement can be performed, and different material can be moved to different location as per needed. In another example, mobility component 111 including identify other opportunities based on the movement direction from one location to another location of the materials.

Another recommendation can include workflow collaboration of placing materials. For example, the recommendation can also identify whether additional processes/activities are to be performed on the material is being moved, then the approach can also move appropriate processing machines along with the material and will be controlled by the material movement platform.

Another recommendation can provide for modular platform movement and planning collaboration. For example, the machines can collaborate with each other and can perform optimum movement/repositioning of the machines (i.e., dynamically rearranging platforms) and the assembling of the modular platform so that, material movement is optimum on the machine shopfloor. In another example, mobility component 111 can identify which machine is assigned with what activity and where the material will be moving and identifying various contextual environmental parameters, like weather condition, floor condition, like slippery floor, raining etc.

Another recommendation can provide processing and minimizing activity sequence of workflows. For example, based on the activities are to be performed on the machine shopfloor, different machines, activity workflow sequence, timing of material movement, etc., the modular material movement platforms can be dynamically assembled and disassembled so that, the machine does not have to wait for material to receive for processing.

Mobility component 111 can operate based on various principles and factors. Some factors can include, but it is not limited to, i) knowing the material to be transported and the destination for the material, ii) minimize distance and time to transport materials and iii) increase productivity with assembly.

Database 116 is a repository for data used by mobility component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within material mobility environment 100, provided that mobility component 111 has access to database 116. Database 116 may store information associated with, but is not limited to, knowledge corpus related to, location and status of all mobility platform 104, environmental conditions associated with the location of the mobility platform, historical data related to routes and path used by mobility platform, training dataset to be used by machine learning for calculating optimal route/path, attributes of materials, corpus of assembly routines and materials required at each assembly machine location, source location to load materials and best method of loading and unloading materials without damage but minimize time.

Figure 2A:
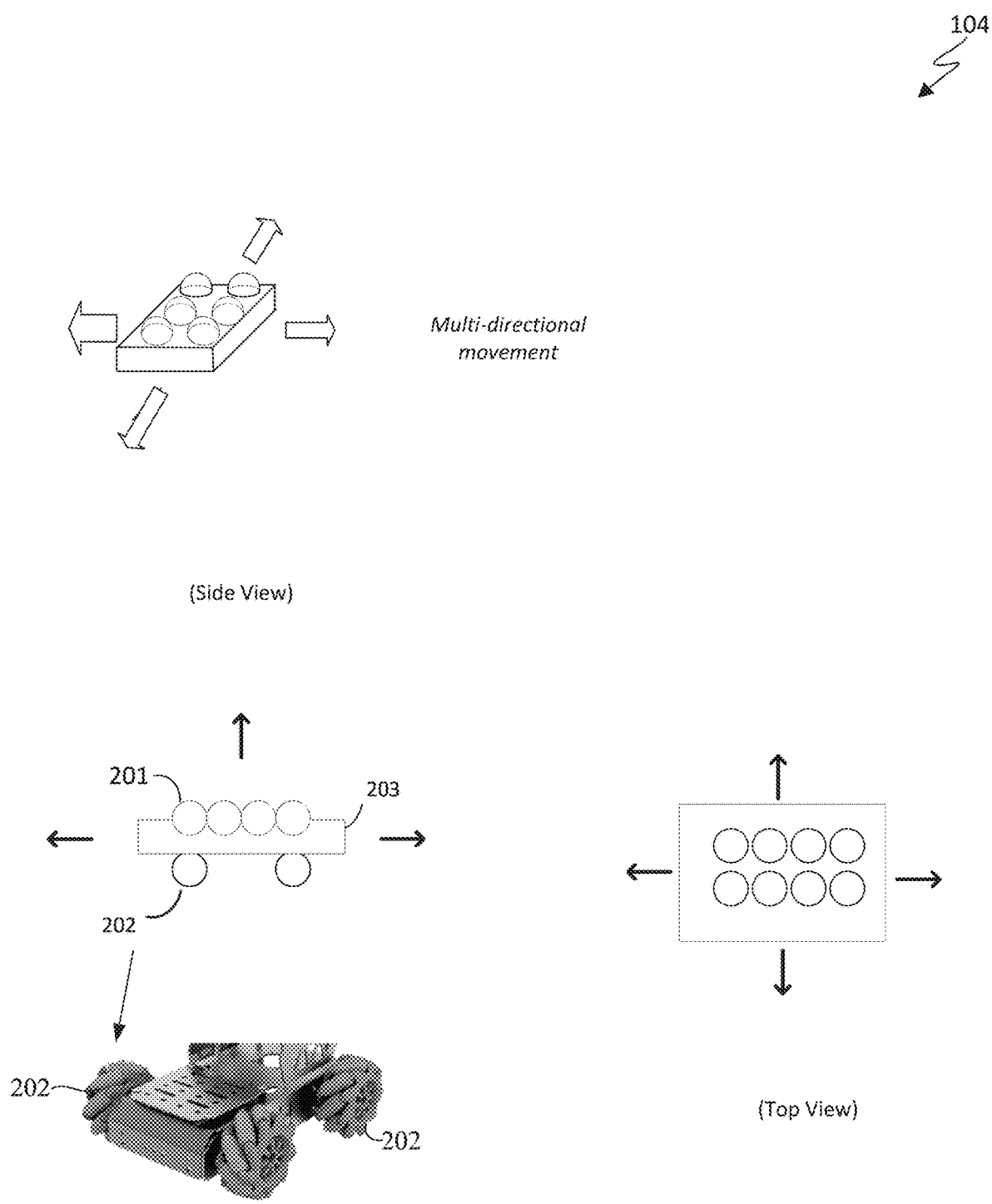
FIG. 2A is a more detailed illustration of mobility platform 104, in accordance with an embodiment of the present invention.

FIG. 2A is a more detailed illustration of mobility platform 104, in accordance with an embodiment of the present invention. As previous mentioned, mobility platform 104 are modular and expandable platform (i.e., base platform 203) equipped with multiple segmented rollers along the topside (rollers 201), wherein the segmented rollers will synchronously work to move any boxes or materials (i.e., 105) in three-dimensional x-y-z axial direction. Along the bottom side of the platform, there are wheels (wheels 202) that can also move the entire structure in any two-dimensions along the x-y direction.

Rollers 201 can be multi-segmented rollers (e.g., spherical balls, grips, etc.) that can secure materials 105 during movement and be able to orient materials 105 in any direction but can allow the materials 105 to easily slide off after mobility platform 104 reach its destination. In an embodiment, rollers 201, can move in any direction and has multi-speed capability. Thus, if any object is kept on the upper surface of the modular platform, then along with the rotation of the roller, the material will also be moving without falling off the platform. In other embodiments, rollers 201 can be gripping claws and self-opening and self-closing walls to keep materials from falling off the platform.

Wheels 202 are multi-directional wheels that are capable of providing locomotion/propulsion for mobility platform 104. In other embodiments, wheels 202 can include tread-like means of movement (i.e., from tanks).

Base platform 203 may contain built-in various sensors (e.g., proximity, object recognition, distance, etc.) to help navigate and avoid obstacles along a dynamic path. Base platform 203 can contain interchangeable battery packs that can be charged and recharged as needed. Any current battery technology may be utilized. Additionally, base platform 203 and/or wheels 202 may contain hydraulic lifts or mechanic lifting mechanism (scissors) that allows the base platform 203 to be raised or lowered to deliver materials 105 smoothly and efficiently at the destination or pickup location. Furthermore, base platform 203 may contain electromechanical coupling mechanism that allows for another base platform to connect/combine with each other. Any existing technology (such as trains, conveyor system, etc.) can be leveraged to implement the coupling mechanism (see 230 of FIG. 2B). Base platform 203 also contains a computer programming unit, capable of executing instructions received via network 101. The computer programming unit forms a central nervous system for the mobility platform and receiving data from on board sensors and IoT devices 103. Computer programming unit is able to instruction and control wheels 202 and rollers 201.

FIG. 2B is an alternative version of the modular capability of mobility platform 104 that can be expanded wherein, mobility platform 104 can be "assembled" or "coupled to" (e.g., mechanically or any other coupling method) with each other to create a larger material movement platform. Furthermore, the combined platforms can move in any direction and able to perform the same functionality as one single mobility platform 104 can perform except accommodating a larger material (i.e., materials 105).

Figure 3:
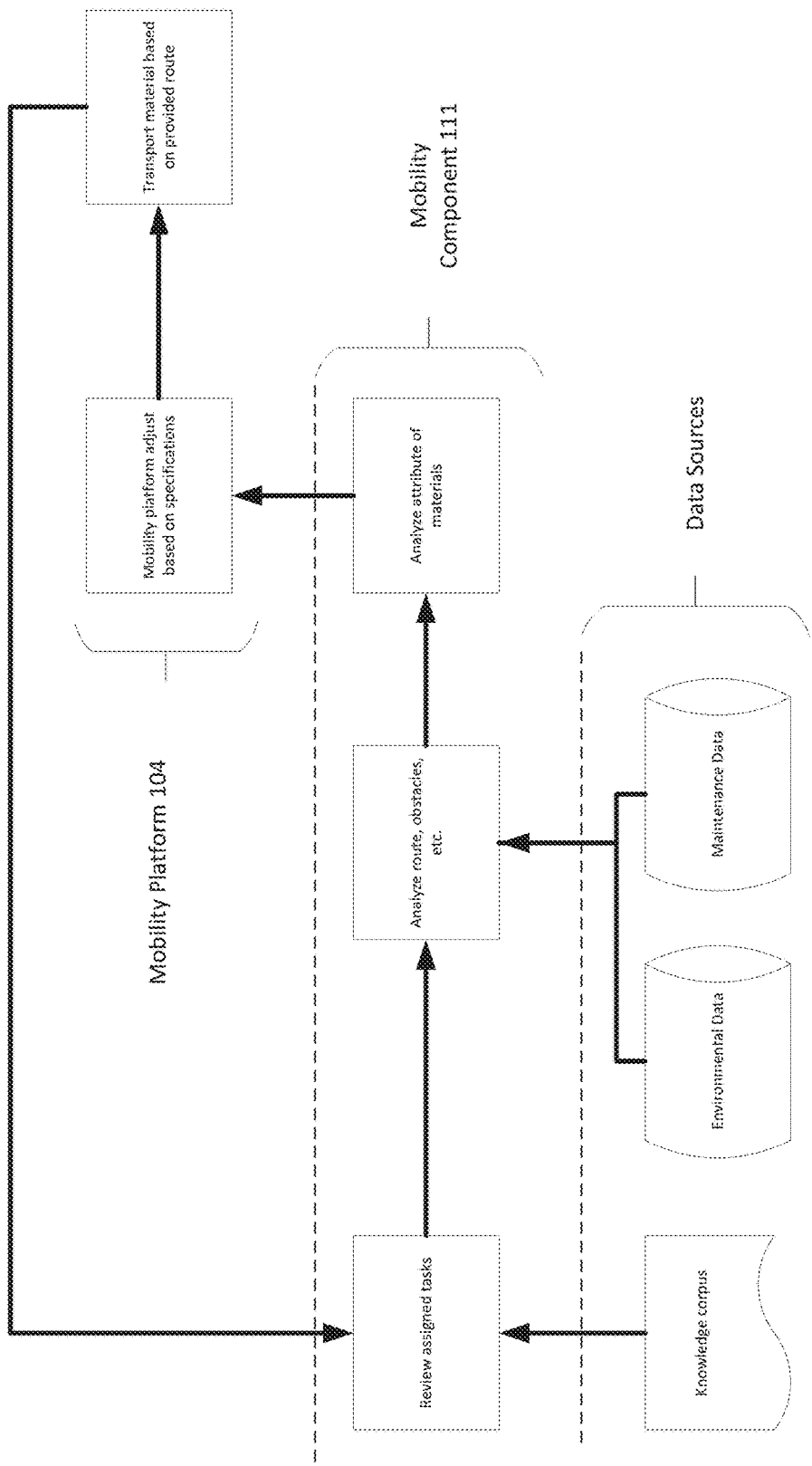
FIG. 3 is a system context flow diagram illustrating material mobility environment, in accordance with another embodiment of the present invention.

FIG. 3 is a system context flow diagram illustrating material mobility environment, in accordance with another embodiment of the present invention. Data sources can include environmental data, maintenance data and other knowledge corpus to be used by mobility component 111. Mobility component 111 can review assigned tasks, analyze routes and attributes of materials before instructing mobility platform 104 to load/move/unload in the most efficient and optimal manner.

Figure 4:
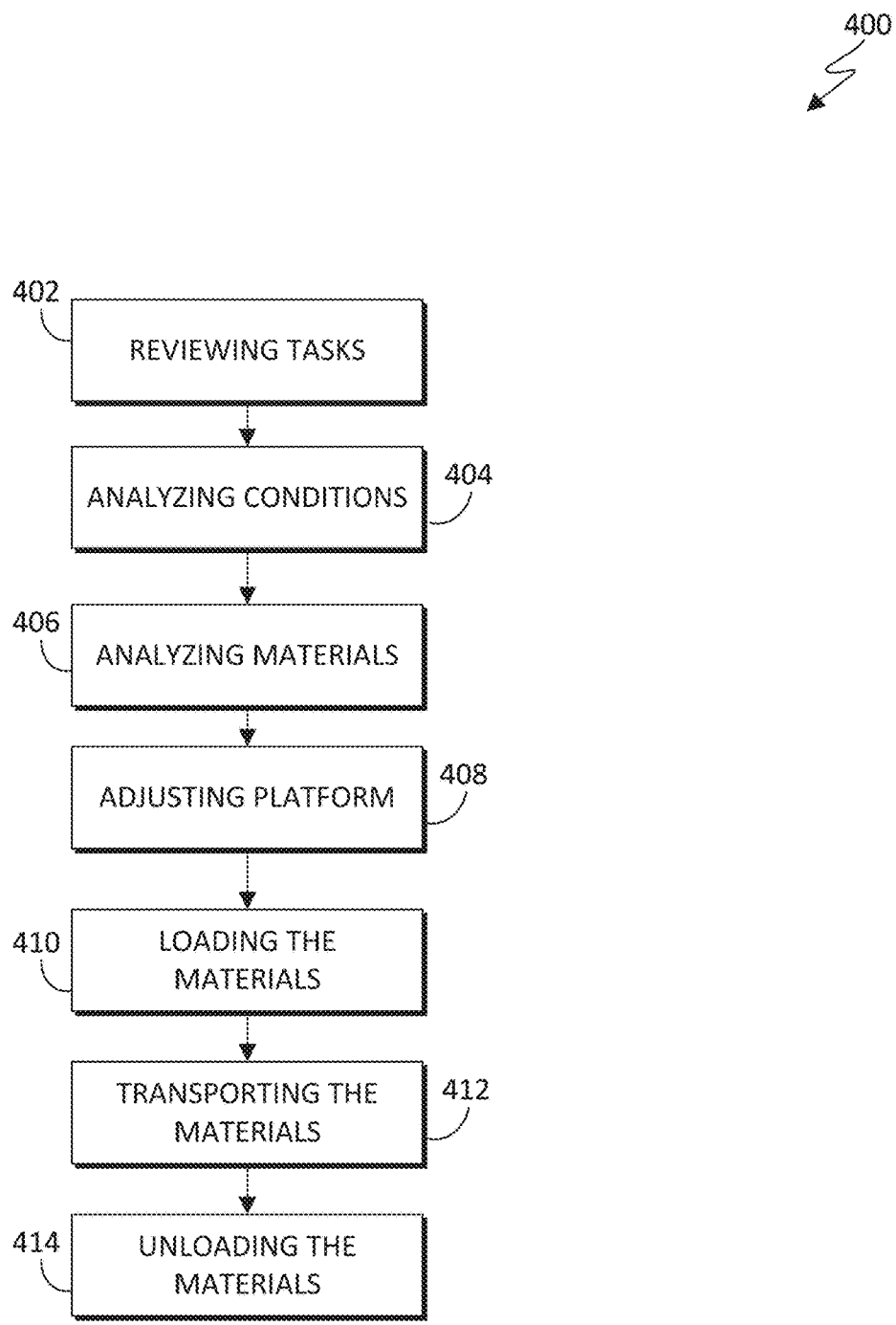
FIG. 4 is a high-level flowchart illustrating the mobility component 111, designated as 400, in accordance with another embodiment of the present invention.

FIG. 4 is a high-level flowchart illustrating the mobility component 111, designated as 400, in accordance with one embodiment of the present invention.

Mobility component 111 reviews tasks and workflows (step 402). In an embodiment, mobility component 111, reviewing tasks such as, platform movements, combining modular movement platforms, what materials need to be moved from which location to another, etc. to be performed. Mobility component 111, using artificial intelligence, may review the task based on a historic knowledge corpus associated with mobility platform 104 and materials to be transported or can use the current instructions from the users to review the tasks to be performed.

Recall that the terminology of workflow from prior discussion means that in this context, is a terminology used in industrial/manufacturing scenarios where products are to be assembled. Thus, workflows can include, certain materials to be used at a certain machine at a certain time as not to miss assembly of a product. Workflows can include routine schedule of when and where to load which machines with what raw material. Or workflows can be dynamic based on the just-time-time manufacturing methodology. Thus, workflows can be driven by business needs instead of routine manufacturing schedule. Other factors that may influence workflow activities can include, i) timing of materials movement, ii) distance (source and target destination of material movement), ii) sequency (i.e., identifying the sequence of material movement the properties of material movement).

Mobility component 111 analyzes environment conditions (step 404). In an embodiment, mobility component 111, scans the area where material(s) is to be transported from one location to another to determine environmental conditions. Environmental conditions can include weather and other conditions (e.g., floor condition, slippery, pitted, etc.). The data can be used to calculate an optimal route based on distance of material movement, source, and target locations of material.

Mobility component 111 analyzes attributes of the materials (step 406). In an embodiment, mobility component 111, analyze the attributes of the materials which can include dimensions such, as, size, weight, and pieces or other attributes such as composition and density.

Mobility component 111 adjusts mobility platform (step 408). In an embodiment, mobility component 111, adjusts mobility platform based on analysis of the material attributes. This adjustment can include, selecting one mobility platform or joining multiple mobility platforms. For example, if the material is small enough then only one mobility platform 104 is needed. However, if the material is too big for one platform can handle then mobility component 111 may instruct other platforms to join/combine together.

Mobility component 111 loads the material (step 410). In an embodiment, mobility component 111, loads the material onto mobility platform. For example, the roller of the material movement platform can start rolling and accordingly the material can start to move based on the movement of the roller. This can include adjacent mobility platform (loading/unloading from another mobility platform 104), where the rollers of the delivery platform can begin to roll to send the material to the receiving platform.

Mobility component 111 transports the material (step 412). In an embodiment, mobility component 111, instructs mobility platform 104 to transport the material to the target destination, based on the calculated optimal route or based on path instructions from the user. It is noted that the default route calculation is an optimal one which avoids obstacles and minimizes time and energy.

Mobility component 111 unloads the material (step 414). In an embodiment, mobility component 111, unloading the materials via mobility platform 104. The same methodology from step 310 may be leveraged for the unloading process.

In other embodiments, when an activity is to be performed on the material while it is moving, mobility platform 104 can also place one or more portable assembly machines on the material movement so that the materials can be utilized without any interruption to the assembly process.

Figure 5:
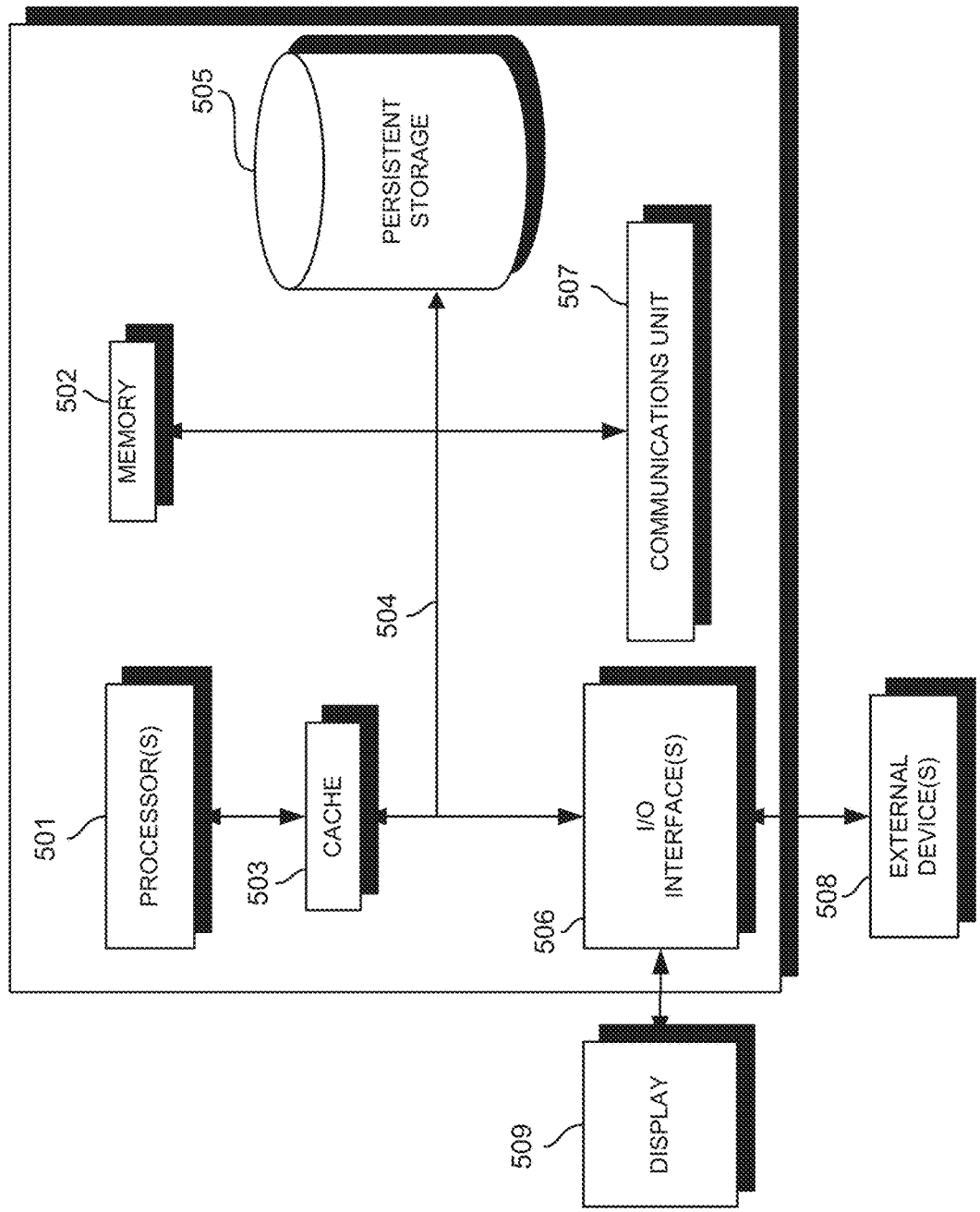
FIG. 5 depicts a block diagram, designated as 500, of components of a server computer capable of executing the mobility component 111 within the material mobility environment 100, in accordance with an embodiment of the present invention.

FIG. 5, designated as 500, depicts a block diagram of components of mobility component 111 application, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data x10) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Mobility component 111 can be stored in persistent storage 505 for access and/or execution by one or more of the respective processor(s) 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., mobility component 111) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., mobility component 111) used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the proposed concept may be summarized in a nutshell in the following clauses:
1. Autonomous Materials Movement: Based on contextual need of material movement from one location to another location in any machine shopfloor, a set of individual modular material movement platform will dynamically be assembled with each other to create a larger material movement platform in the machine shopfloor, and accordingly will be controlling the material movement to different directions in a programmatic manner.
2. Intelligent Workflow-Materials Placement Application: Based on the identified activity workflow, types of materials are to be handled, the proposed system can recognize each material are to be moved and will dynamically be adjusting the material movement parameters individually from one location to another location.
3. Dynamic Optimized Materials Location: The modular material movement platform can analyze different source and target location of different materials and accordingly the modular platforms can be assembled in an optimum manner so that faster material movement can be performed, and different material can be moved to different location as per the need.
4. Workflow Collaboration for Materials Placement: Along with material movement, the proposed system can also identify if additional processes/activities are to be performed on the material is being moved, then the proposed system can also move appropriate processing machines along with the material and can be controlled by the material movement platform.
5. Modular Platform Movement and Planning Collaboration: The modular material movement platform, and the machines can collaborate with each other and can be performing optimum movement/repositioning of the machines and the assembling of the modular platform so that, material movement is optimum on the machine shopfloor.
6. Processing and Activity Sequencing Workflow Amelioration: Based on the activities are to be performed on the machine shopfloor, different machines, activity workflow sequence, timing of material movement etc., the modular material movement platforms can dynamically assemble and disassembled so that, the machine does not have to wait for material to receive for processing.

What is claimed is:

1. A system for moving materials from one location to another, the system comprising:
a mobility platform, wherein the mobility platform is a modular and expandable platform equipped with segmented rollers that allows multi-directional for moving materials from one location to another;
one or more computer processors;
one or more computer readable storage media; and
program instructions stored on the one or more computer readable storage media for execution by at least one of the one or more computer processors, the program instructions comprising:
program instructions to review tasks and workflows to be performed, wherein the workflows are associated with what materials and when the materials are needed for assembly in a manufacturing environment;
program instructions to analyze environmental conditions to calculate an initial optimal route;
program instructions to analyze material attributes;
program instructions to adjust the mobility platform based on analysis of the material attributes;
program instructions to load materials on to the mobility platform;
program instructions to move the mobility platform to a target destination;
program instructions to receive sensor data from IoT devices on board the mobility platform;
program instructions to calculate a dynamic path from the initial optimal route based on, at least, location of obstacles;
program instructions to move the mobility platform along the dynamic path towards the target destination wherein the target destination includes at least, assembly machine;
program instructions to reposition the assembly machines used to assemble the materials for easy access by the mobility platform; and
program instructions to unload the materials from the mobility platform.

2. The system of claim 1, wherein the program instructions to review tasks and workflows to be performed, is performed by an artificial intelligence component and factors relating to the workflows includes, timing of material movement, distance associated with the material movement and sequency.

3. The system of claim 1, wherein program instructions to review the tasks is based on based on a historic knowledge corpus.

4. The system of claim 1, wherein environmental conditions further comprises, weather conditions and floor condition, slippery or pitted.

5. The system of claim 1, wherein program instructions to analyze environmental conditions is based on distance of material movement, source and target locations of material.

6. The system of claim 1, wherein material attributes further comprises of size, weight, pieces.

\* \* \* \* \*